United States Patent
Nakajima et al.

(10) Patent No.: US 10,423,549 B2
(45) Date of Patent: Sep. 24, 2019

(54) COMPUTER SYSTEM AND APPARATUS MANAGEMENT METHOD

(71) Applicant: HITACHI, LTD., Tokyo (JP)

(72) Inventors: Jun Nakajima, Tokyo (JP); Noriko Nakajima, Tokyo (JP); Hironori Emaru, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/758,356

(22) PCT Filed: Dec. 4, 2015

(86) PCT No.: PCT/JP2015/084192
§ 371 (c)(1),
(2) Date: Mar. 8, 2018

(87) PCT Pub. No.: WO2017/094194
PCT Pub. Date: Jun. 8, 2017

(65) Prior Publication Data
US 2018/0246823 A1    Aug. 30, 2018

(51) Int. Cl.
*G06F 13/16* (2006.01)
*G06F 3/06* (2006.01)

(52) U.S. Cl.
CPC ........ *G06F 13/1694* (2013.01); *G06F 3/0605* (2013.01); *G06F 3/067* (2013.01); *G06F 3/0631* (2013.01); *G06F 3/0653* (2013.01); *G06F 13/1689* (2013.01)

(58) Field of Classification Search
None
See application file for complete search history.

(56) References Cited

U.S. PATENT DOCUMENTS

| | | | | |
|---|---|---|---|---|
| 6,148,335 | A * | 11/2000 | Haggard | H04L 41/22 709/224 |
| 6,766,430 | B2 * | 7/2004 | Arakawa | G06F 3/0605 707/999.01 |
| 7,707,199 | B2 | 4/2010 | Shinohara et al. | |
| 8,776,050 | B2 * | 7/2014 | Plouffe | G06F 9/45537 718/1 |

(Continued)

OTHER PUBLICATIONS

International Search Report of PCT/JP2015/084192 dated Feb. 23, 2016.

*Primary Examiner* — Michael Alsip
(74) *Attorney, Agent, or Firm* — Mattingly & Malur, PC

(57) ABSTRACT

Provided is a computer system, comprising a plurality of devices and a plurality of management computers. The devices further comprise one or more objects. The plurality of management computers provides services with the one or more objects being subjects to be managed. An information provision period is set for each of the objects of each of the services. On the basis of an information collection policy relating to collecting information about the objects and the information provision period which is set for each of the objects of each of the services which is running, a primary management computer determines the management computer which handles the collection of the information of each of the objects, and notifies each of the management computer that has been so determined of the objects which said management computer will handle the management for.

18 Claims, 14 Drawing Sheets

(56) References Cited

U.S. PATENT DOCUMENTS

2011/0286328 A1* 11/2011 Sugauchi ............ G06F 11/3433
370/230
2012/0042124 A1* 2/2012 Miyamoto ............ G06F 3/0605
711/114
2014/0006740 A1* 1/2014 Tokusho ................ G06F 12/02
711/165

* cited by examiner

| Service type-specific management table ||| 
| 1121 | 1122 | 1123 |
| Service type | Information provision interval | Object type |
| Performance monitoring service | 5 minutes or longer | Volume |
| | | Port |
| | | Pool |
| Performance analysis service | 5 minutes or longer | Volume |
| | | Port |
| | | Pool |
| Data optimal arrangement service | 30 minutes or longer | Volume |
| | | Pool |
| | | Processor |
| | | Cache |
| Data capacity monitoring service | 5 minutes or longer | Pool |
| ... | ... | ... |

| Configuration information table |||||||
|---|---|---|---|---|---|---|
| 1131 | 1132 | 1133 | 1134 | 1135 | 1136 | 1137 |
| Operation ID | Server ID | Virtual computer ID | Storage ID | Port ID | Volume ID | Pool ID |
| Operation X | Sv1 | VM1 | Stg1 | PortA | Vol1 | Pool10 |
| Operation X | Sv1 | VM2 | Stg1 | PortA | Vol2 | Pool11 |
| Operation Y | Sv2 | VM3 | Stg1 | PortA | Vol3 | Pool12 |

Running service management table

| 1141 | 1142 | 1143 | 1144 | 1145 | 1146 | 1147 | 1148 |
|---|---|---|---|---|---|---|---|
| Running service ID | Service type | Information provision interval | Operation ID | Apparatus type | Apparatus ID | Object type | Object ID |
| 1 | Performance analysis service | 10 minutes | Operation Y | Storage | Stg1 | Port | PortA |
| | | | | | | Volume | Vol1 |
| | | | | | | | Vol2 |
| | | | | | | Pool | Pool10 |
| 2 | Capacity monitoring service | 15 minutes | N/A | Storage | Sgt1 | Pool | Pool10 |
| | | | | | | | Pool11 |
| | | | | | Stg2 | Pool | Pool20 |
| 3 | Performance monitoring service | 5 minutes | Operation X | Storage | Stg1 | Port | PortA |
| | | | | | | Volume | Vol3 |
| | | | | | | Pool | Pool11 |

Fig. 8

Handler management table (1150)

| Timing (1151) | Management computer ID (1152) | Apparatus type (1153) | Apparatus ID (1154) | Object type (1155) | Object ID (1156) | Related service ID (1157) |
|---|---|---|---|---|---|---|
| Interval1 (5 minutes) | Management computer 1 | Storage | Stg1 | Port | PortA | Service 3 |
| | Management computer 2 | Storage | Stg1 | Volume | Vol3 | Service 3 |
| | Management computer 3 | Storage | Stg1 | Pool | Pool11 | Service 3 |
| ... | ... | ... | ... | ... | ... | ... |
| Interval6 (30 minutes) | Management computer 1 | Storage | Stg1 | Port | PortA | Service 1 |
| | | | | | | Service 3 |
| | | | Stg2 | Pool | Pool20 | Service 2 |
| | Management computer 2 | Storage | Stg1 | Volume | Vol1 | Service 1 |
| | | | | | Vol2 | Service 1 |
| | | | | | Vol3 | Service 3 |
| | Management computer 3 | Storage | Stg1 | Pool | Pool10 | Service 1 |
| | | | | | | Service 2 |
| | | | | | Pool11 | Service 2 |
| | | | | | | Service 3 |

COMPUTER SYSTEM AND APPARATUS MANAGEMENT METHOD

TECHNICAL FIELD

The present invention relates to a technique for a computer system and particularly relates to a technique for managing apparatuses.

BACKGROUND ART

As scales of computer systems have expanded, operation management of the computer systems have also become complex. In consideration thereof, management SaaS (Software as a Service) which provides management of a computer system as a service is being proposed.

PTL 1 discloses a technique for managing a plurality of computers that are management targets by collecting all information related to objects (for example, volumes of storage apparatuses) included in each computer.

CITATION LIST

Patent Literature

[PTL 1]
U.S. Pat. No. 7,707,199

SUMMARY OF INVENTION

Technical Problem

However, in the case of PTL 1, a management computer must collect all information related to objects included in each of a plurality of computers. Therefore, as scales of computer systems expand, a load on a management computer increases and, in turn, a load on computers providing information on objects also increases.

In consideration thereof, an object of the present invention is to reduce loads on a management computer and a plurality of apparatuses included in a computer system when managing the plurality of apparatuses.

Solution to Problem

A computer system according to an embodiment includes a plurality of apparatuses and a plurality of management computers. A device includes one or more objects to be management targets by the management computers. The plurality of management computers provide services with the one or more objects as management targets. An information provision period is configured for each of the objects of each of the services. A primary management computer being one of the plurality of management computers determines a management computer to handle collection of information on each of the objects on the basis of an information collection policy defining a policy regarding collecting information about the objects and the information provision period configured for each of the objects of each of the services that are running, and notifies each of the determined management computers of an object of which management is to be handled by the management computer.

Advantageous Effects of Invention

According to the present invention, loads on a management computer and a plurality of apparatuses included in a computer system when managing the plurality of apparatuses can be reduced.

BRIEF DESCRIPTION OF DRAWINGS

FIG. 4 shows a configuration example of a service type-specific management table.

FIG. 5 shows a configuration example of a configuration information table.

FIG. 6 shows a configuration example of a running service management table.

FIG. 8 shows a configuration example of a handler management table.

DESCRIPTION OF EMBODIMENTS

Hereinafter, an embodiment will be described. Although information will be described below using expressions such as an "xxx table", information may be expressed using any kind of data structure. In other words, an "xxx table" can also be referred to as "xxx information" in order to demonstrate that information is not dependent on data structure.

In addition, while a "program" is sometimes used as a subject when describing processing in the following description, since a program causes prescribed processing to be performed while using at least one of a storage resource (for example, a memory) and a communication interface device as appropriate by being executed by a processor (for example, a CPU (Central Processing Unit)), a processor or an apparatus including the processor may be used as a subject of processing. Processing performed by a processor may be partially or entirely performed by a hardware circuit. A computer program may be installed from a program source. The program source may be a program distribution server or a storage medium (for example, a portable storage medium).

Furthermore, in the following description, a set of one or more computers which manage at least one apparatus included in a computer system may be referred to as a "management system". When a management computer displays display information, the management computer may constitute a management system. In addition, a combination of a management computer and a display computer may also constitute a management system. Furthermore, processing identical or similar to that of a management computer maybe realized by a plurality of computers in order to increase speed or reliability of management processing. In this case, the plurality of computers (when a display computer performs display, the display computer may also be included) may constitute a management system. In the present embodiment, a management computer constitutes a management system. Moreover, a management computer displaying information may signify displaying information on a display device included in the management computer or transmitting display information to a display computer (for example, a client) being coupled to the management computer (for example, a server). In the case of the latter, information representing display information is displayed by the display computer on the display device included in the display computer.

(First Embodiment)

Figure 1:
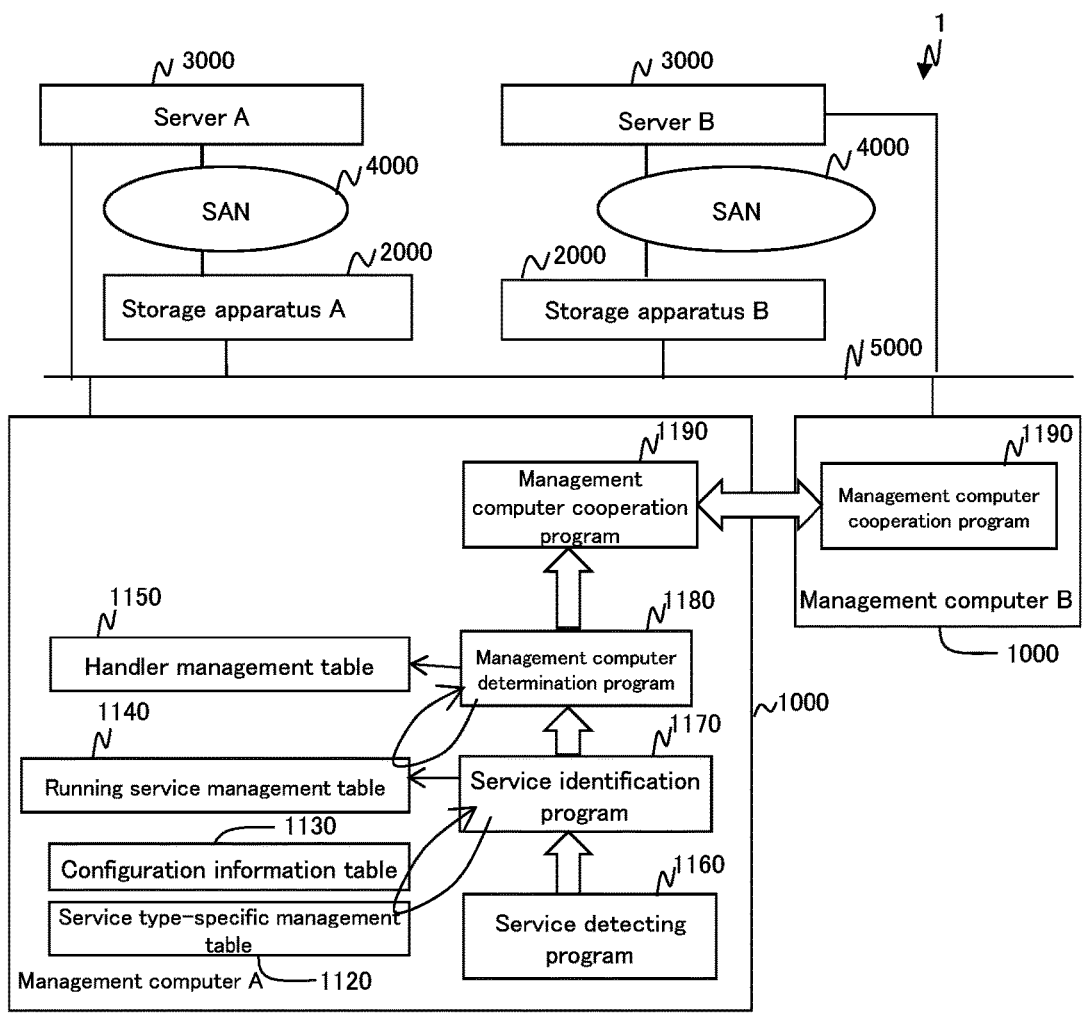
FIG. 1 is an explanatory diagram showing an outline of the present embodiment.

FIG. 1 is an explanatory diagram showing an outline of the present embodiment.

A computer system 1 includes a plurality of storage apparatuses 2000 which are examples of computers and a plurality of management computers 1000. The storage apparatuses 2000 may include one or more objects. The plurality of management computers 1000 are capable of cooperating with one another to provide services with the one or more objects as management targets. An information provision period is configured for each object of each service.

A primary management computer (for example, a management computer A) which is one of the plurality of management computers 1000 determines a management computer 1000 (for example, a management computer B) to handle collection of information on each object on the basis of an information collection policy defining a policy regarding collecting information about the objects and the information provision period configured for each object of each running service, and notifies each determined management computer 1000 of an object to be handled by the management computer 1000.

When sensing a change in an operational status of a service, the primary management computer may determine a management computer 1000 to handle collection of information on each object described above and execute processing of a notification to each determined management computer 1000. Examples of a change in an operational status of a service include a case where operation of a new service is started, a case where a service in operation is deleted, and a case where a change is made to an object to be a management target by the service in operation.

Figure 2:
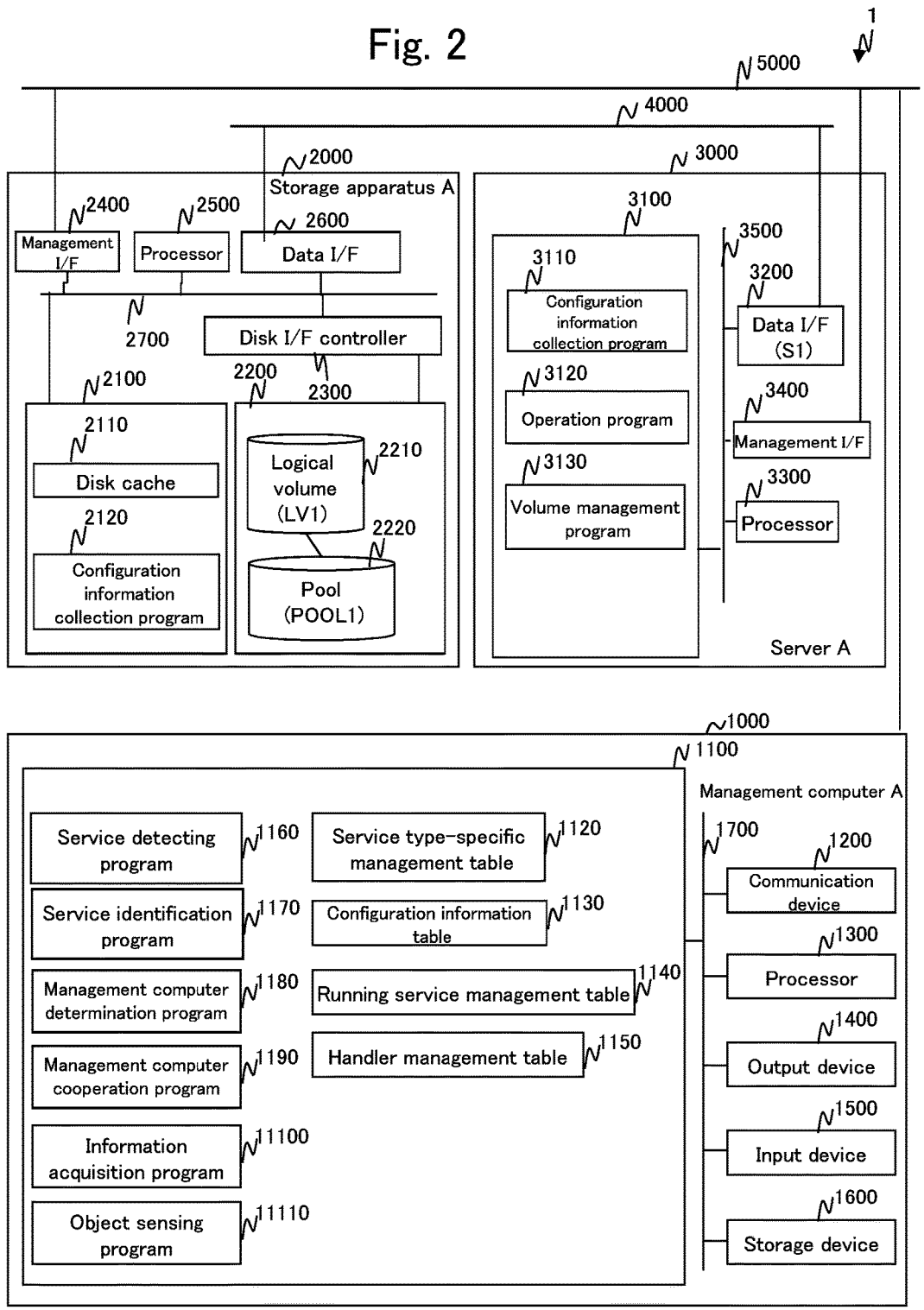
FIG. 2 shows a configuration example of a computer system.

FIG. 2 shows a configuration of a computer system.

The computer system 1 according to the present embodiment includes one or more management computers 1000, one or more storage apparatuses 2000 which are examples of apparatuses, and one or more servers 3000 which are examples of apparatuses.

The servers 3000 and the storage apparatuses 2000 are coupled to one another via a SAN (Storage Area Network) 4000 which is an example of a data network. Examples of a SAN include Fibre Channel.

<Management Computer>

The management computers 1000, the storage apparatuses 2000, and the servers 3000 are coupled to one another via a management network 5000.

The management computer 1000 may include a memory 1100, a communication device 1200, a processor 1300, an output device 1400, an input device 1500, and a storage device 1600. These elements may be coupled via an internal bus 1700 so as to be capable of bidirectional communication.

The memory 1100 may store a service type-specific management table 1120, a configuration information table 1130, a running service management table 1140, a handler management table 1150, a service detecting program 1160, a service identification program 1170, a management computer determination program 1180, a management computer cooperation program 1190, an information acquisition program 11100, and an object sensing program 11110.

The service type-specific management table 1120 manages services which can be provided by the management computers 1000. Details of the service type-specific management table 1120 will be provided later (refer to FIG. 4).

The configuration information table 1130 manages information related to a configuration of the computer system 1. Details of the configuration information table 1130 will be provided later (refer to FIG. 5).

The communication device 1200 is a device for coupling the management computer 1000 to the management network 5000.

The processor 1300 is a device capable of executing a program deployed on the memory 1100. The various functions included in the management computer 1000 may be realized as the processor executes the program.

The output device 1400 is a device for outputting a result of processing executed by the management computer 1000. Examples of the output device include a display and a speaker.

The input device 1500 is a device used by a manager to input an instruction to the management computer 1000. Examples of the input device include a keyboard and a mouse.

The storage device 1600 is a device capable of holding information (data). Examples of the storage device 1600 include an HDD (Hard Disk Drive) and an SSD (Solid State Device).

A plurality of virtual management computers may run on one or more physical management computers. In this case, each of the plurality of virtual management computers may have the programs 1160, 1170, 1180, 1190, 11100, and 11110 and may execute these programs.

In the present embodiment, the respective tables included in the memory 1100 such as the configuration information table 1130 will be described using a form of an RDB (Relational Database). In this case, typically, information between management computers is synchronized by transmitting and/or receiving information after ensuring consistency of information of DBs between the management computers. However, the form and the synchronization method of DBs are not limited thereto. For example, information may be shared between management computers using a distributed KVS (Key Value Store).

The various programs and tables may be stored in a storage other than the memory 1100 such as the storage device 1600 or another storage apparatus (not shown). In this case, the processor 1300 may acquire the various programs and tables and execute the various programs and tables by deploying the same on the memory 1100. Alternatively, the programs and the tables maybe stored in a memory 2100 of the storage apparatus 2000 and the storage apparatus 2000 or the server 3000 may execute the programs stored in the memory 2100. Alternatively, another apparatus such as another server 3000 or a switch (not shown) may store the programs and the tables in a prescribed memory and execute the programs stored in the memory.

The management computer 1000 may be capable of communicating with a program running on the server 3000 through the management network 5000.

<Storage Apparatus>

The storage apparatus 2000 may include a memory 2100, a storage device 2200, a disk I/F controller 2300, a management I/F 2400, a processor 2500, and a data I/F 2600. These elements may be coupled via a communication path 2700 such as an internal bus so as to be capable of bidirectional communication.

The memory 2100 may include a disk cache 2110. The disk cache 2110 is a storage area for temporarily storing information.

The memory 2100 may store a configuration information collection program 2120. The configuration information collection program 2120 is a program for transmitting and receiving management information, performance information, and the like of the storage apparatus 2000 to and from the management computer 1000.

The storage apparatus may include a pool 2220 constituted by storage areas of one or more storage devices 2200. In addition, the storage apparatus 2000 may logically divide the area of the pool 2220 and provide the logically divided areas as logical volumes 2210. An external apparatus maybe capable of accessing, via a communication network, the logical volumes 2210 provided by the storage apparatus 2000.

Each pool 2220 and each logical volume 2210 may be assigned an ID. Accordingly, the storage apparatus 2000 becomes capable of uniquely identifying each of the pools 2220 and the logical volumes 2210.

In the case of FIG. 2, one pool 2220 (POOL1) is logically divided, and one logical volume 2210 (LV1) has been generated using one of the logical divisions. In addition, an external apparatus (for example, the server 3000) is provided with the logical volume 2210 (LV1). Moreover, one logical volume 2210 may be created using an entire storage area of one pool 2220.

The disk I/F controller 2300 is a device for coupling and controlling the storage device 2200. Examples of the storage device 2200 include an HDD and a flash memory.

The management I/F 2400 is a device for coupling the storage apparatus 2000 to the management network 5000.

The processor 2500 is a device which executes a program deployed on the memory 2100.

The data I/F 2600 is a device for coupling the storage apparatus 2000 to the SAN 4000.

The configuration information collection program 2120 maybe stored in a storage other than the memory 2100 such as another storage apparatus or another storage medium. In this case, when executing processing, the processor 2500 may acquire the configuration information collection program 2120 and execute the configuration information collection program 2120 by deploying the same on the memory 2100.

Alternatively, the configuration information collection program 2120 may be stored in the memory 1100 of the management computer 1000. In addition, the processor 1300 of the management computer 1000 may execute the configuration information collection program 2120.

Alternatively, the configuration information collection program 2120 may be stored in another storage apparatus. In addition, a processor of the other storage apparatus may execute the configuration information collection program 2120.

<Server>

The server 3000 may include a memory 3100, a data I/F 3200, a processor 3300, and a management I/F 3400. These elements may be coupled via a communication path 3500 such as an internal bus so as to be capable of bidirectional communication.

The memory 3100 may store a configuration information collection program 3110, an operation program 3120, and a volume management program 3130.

The configuration information collection program 3110 is a program for transmitting and receiving management information, performance information, and the like of the server 3000 to and from the management computer 1000.

The operation program 3120 is a program for realizing operations to be executed by the server 3000. Examples of the operation program 3120 include a DBMS (Data Base Management System) and a file system.

The volume management program 3130 is a program for allocating the logical volume 2210 provided by the storage apparatus 2000 to the server 3000.

The server 3000 executes various operations using the logical volume 2210 provided by the storage apparatus 2000.

The various programs may be stored in a storage other than the memory 3100 such as another storage device. In this case, when executing processing, the processor 3300 may acquire a processing target program and execute the program by deploying the same on the memory 3100.

In the case of FIG. 2, a server A and a storage apparatus A are coupled to each other via the SAN 4000. The coupling between the storage apparatus 2000 and the server 3000 is not limited to direct coupling via Fibre Channel. For example, the storage apparatus 2000 and the server 3000 may be coupled via one or more network devices such as a Fibre Channel switch. The coupling between the storage apparatus 2000 and the server 3000 need only be a network for data communication and may be, for example, an IP (Internet Protocol) network.

Figure 3:
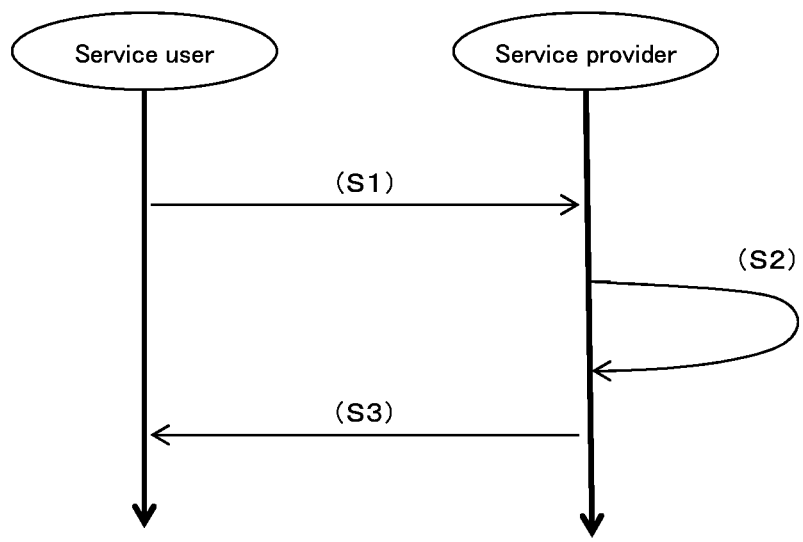
FIG. 3 is a sequence chart showing an example of interaction between a provider and a user of a service.

FIG. 3 is a sequence chart showing an example of interaction between a provider and a user of a service.

(S1) A service user issues a use request for a service to a service provider. The use request for a service may include a request for an operation to which the service is to be applied and a request regarding an information provision interval. This operation may correspond to the processing of step 101 in the flow chart shown in FIG. 9, step 301 in the flow chart shown in FIG. 11, or the like.

(S2) Upon receiving the use request for a service, the service provider specifies an object (a component such as a server or a storage: an object may also be referred to as a resource) to be used in the service as well as a service for managing the service on the basis of the use request for a service. A "service" according to the present embodiment may be a service (in other words, a "management service") for managing a service to be provided to a service user.

(S3) The service provider provides the service user with a resource for which a use request had been made and, at the same time, provides a service for managing the provided object.

Information related to a service may include information (an application, a system, or the like) related to an operation to which the service user applies the service.

FIG. 4 shows a configuration example of the service type-specific management table 1120.

The service type-specific management table 1120 is a table for managing information regarding service types. The service type-specific management table 1120 may include, as item values (or column values: the same applies hereinafter), a service type 1121, an information provision interval 1122, and an object type 1123.

The service type 1121 is a type (or an identifier) of a management service that can be provided to a user. Examples of a management service type include a performance monitoring service, a performance analysis service, a data optimal arrangement service, and a data capacity monitoring service. For example, a performance monitoring service is a service for periodically acquiring information regarding performance of an object and presenting whether or not a problem has arisen in the performance of the object.

The information provision interval 1122 is a value indicating an interval (a period) of information provision that can be configured in the management service having the service type 1121. For example, the information provision interval 1122 with respect to the service type 1121 of a "performance monitoring service" being "5 minutes or longer" means that the performance monitoring service is capable of providing information at intervals (periods) of 5 minutes or longer. As the information provision interval 1122, only a lower limit value may be configurable such as "5 minutes or longer" or a lower limit value and an upper limit value may be configurable such as "between 5 to 60 minutes". Alternatively, as the information provision interval 1122, "real time" in which latest information upon the user issuing a request is provided may be configurable instead of periodical information provision. The information provision interval 1122 may be configurable for each object type 1123.

The object type 1123 is information indicating a type of an object necessary for providing the service of the service type 1121. When a management target of a management service is a storage apparatus, examples of the object type 1123 include a "logical volume", a "pool", a "port", a "processor", and a "cache". An apparatus targeted by a service may be a server, a switch, a virtual resource (a virtual server), and the like. In other words, the object type 1123 may correspond to physical and logical components of an apparatus that is a target of a service.

For example, there may be cases where, after being provided information related to object types of a "volume", a "port", and a "pool" related to a storage apparatus from a performance analysis service, carrying out countermeasures on the basis of an analysis result requires disk information on a virtual computer. In this case, in order to enable such disk information on a virtual computer to be acquired in advance, "disk information on virtual computer" may be added to the object type 1123 in the performance analysis service 1121. In other words, object types 1123 associated with the service type 1121 are not limited to those directly necessary for realizing the service type and may also include object types 1123 related to the service type.

Contents of the service type-specific management table 1120 may be configured in advance. Alternatively, contents of the service type-specific management table 1120 may be automatically configured on the basis of information collected from each apparatus of the computer system 1. For example, performance monitoring software may collect information from each apparatus of the computer system 1 and configurations regarding a performance monitoring service may be made on the basis of the collected information.

As the information provision interval 1122, configurable intervals may differ according to the numbers of objects. For example, when the number of objects is less than 10,000, information may be made providable at the information provision interval 1122 of "5 minutes or longer", but when the number of objects is equal to or larger than 10,000, information may be made providable at the information provision interval of "10 minutes or longer".

FIG. 5 shows a configuration example of the configuration information table 1130.

The configuration information table 1130 is a table for managing information regarding a configuration of the computer system 1. The configuration information table 1130 may include, as item values, an operation ID 1131, a server ID 1132, a virtual computer ID 1133, a storage ID 1134, a port ID 1135, a volume ID 1136, and a pool ID 1137.

The operation ID 1131 is an identifier of an operation program being operated on the server 3000.

The server ID 1132 is an identifier of the server 3000.

The virtual computer ID 1133 is an identifier of a virtual computer which runs on the server 3000.

The storage ID 1134 is an identifier of the storage apparatus 2000 to be an access destination of the server 3000.

The port ID 1135 is an identifier of the data I/F 2600 of the storage apparatus 2000 to be used by the physical server 3000 when accessing the logical volume 2210 having the volume ID 1136.

The volume ID 1136 is an identifier of the logical volume 2210.

The pool ID 1137 is an identifier of the pool 2220 used to generate the logical volume 2210 having the volume ID 1136.

A record of the configuration information table 1130 may indicate an apparatus existing on an I/O (input/output) channel from an operation program running on the server 3000 to a pool constituting a logical volume being used by the server 3000. For example, a record with the operation ID 1131 of "operation X" in FIG. 5 indicates that an application of the operation X is running on the virtual computer ID 1133 of "VM1" running on the server ID 1132 of "Sv1", the application of the operation X is capable of accessing the volume ID 1136 of "Vol1" via the port ID 1135 of "PortA" of the storage ID 1134 of "Stg1", and "Vol1" is generated from the pool ID 1137 of "Pool10".

The management computer 1000 may generate the configuration information table 1130 using information collected from each apparatus and the like of the computer system 1.

The management computer 1000 may acquire information related to the configuration information table 1130 in advance separately from information (which may include performance information) on each object. In addition, the configuration information table 1130 may already be generated upon determining an acquisition method of performance information to be described later.

In addition, the management computers 1000 maybe capable of sharing information of the configuration information table 1130. Any sharing method such as a distributed DB may be adopted.

Each of the IDs 1132 to 1137 associated with the operation ID 1131 of the configuration information table 1130 may be described an object to be used when executing the operation program having the operation ID 1131. An object may be either physical or virtual.

The item values of the configuration information table 1130 are not limited to those shown in FIG. 5. For example, the configuration information table 1130 may include, as an item value, an ID of a drive related to a mount point of the server 3000 that is an object to be used by the operation program upon access. For example, the configuration information table 1130 may include, as an item value, an ID of the data I/F 3200 of the server 3000 to be used by the server 3000 when accessing the logical volume 2210 indicated by the volume ID 1136. For example, the configuration information table 1130 may include, as an item value, an ID of the processor 1300 to be used for I/O processing with respect to the logical volume 2210. For example, the configuration information table 1130 may include, as an item value, an ID of a switch, a data I/F of the switch, or the like. For example, the configuration information table 1130 may include, as an item value, an ID of an operation program (such as a DBMS) on the operation server 3000.

FIG. 6 shows a configuration example of the running service management table 1140.

The running service management table 1140 is a table for managing running services. The running service management table 1140 may include, as item values, a running service ID 1141, a service type 1142, an information provision interval 1143, an operation ID 1144, an apparatus type 1145, an apparatus ID 1146, an object type 1147, and an object ID 1148.

The running service ID 1141 is an identifier of a currently running service.

The service type 1142 is information indicating a service type of a service having the running service ID 1141. Information on the service type 1142 maybe any of the service types 1121 in the service type-specific management table 1120.

The information provision interval 1143 is a value (time) indicating intervals of information provision in the service having the running service ID 1141. The information provision interval 1143 may be configured by a user or by a management computer. The information provision interval 1143 may take a value within a range configured in the information provision interval 1122 of the service type-specific management table 1120.

The operation ID 1144 is an identifier indicating an operation program to which the service having the running service ID 1141 is applied. The operation ID 1144 may be configured by a user or by the management computer 1000. The operation ID 1144 may be any of the operation IDs 1131 in the configuration information table 1130.

Services may include those which are not divided according to operation and which are integrally managed as a computer system. In such a case, for example, "N/A" may be configured in the operation ID 1144. In the case of FIG. 6, in a record having the running service ID 1141 of "2" and the service type 1142 of "capacity monitoring service", the operation ID 1144 is given as "N/A". In this case, all pools (1147) are targets of the service.

The apparatus type 1145 is information indicating a type of a device necessary for providing the service having the running service ID 1141. Examples of the apparatus type 1145 include a server, a switch, and a storage.

The apparatus ID 1146 is an identifier of an apparatus necessary for providing the service having the running service ID 1141. In other words, a type of the apparatus having the apparatus ID 1146 is the apparatus type 1145.

The object type 1147 is information indicating a type of an object necessary for providing the service having the running service ID 1141. Examples of the object type 1147 include a port, a volume, and a pool.

The object ID 1148 is an identifier of an object necessary for providing the service having the running service ID 1141. In other words, a type of the object having the object ID 1148 is the object type 1147.

The service identification program 1170 may configure the item values described above using information of a service use request, the service type-specific management table 1120 and/or the configuration information table 1130. As described with reference to FIG. 3, the service use request may by input by a user via the input device 1500 or the communication device 1200.

The service identification program 1170 may determine a correspondence between the service type 1142 and the object type 1147 of the running service management table 1140 on the basis of a correspondence between the service type 1121 and the object type 1123 of the service type-specific management table 1120.

The service identification program 1170 may determine a correspondence among the operation ID 1144, the apparatus type 1145, the apparatus ID 1146, and the object ID 1148 of the running service management table 1140 on the basis of a correspondence among the operation ID 1131 and the respective objects 1132 to 1137 of the configuration information table 1130.

Figure 7:
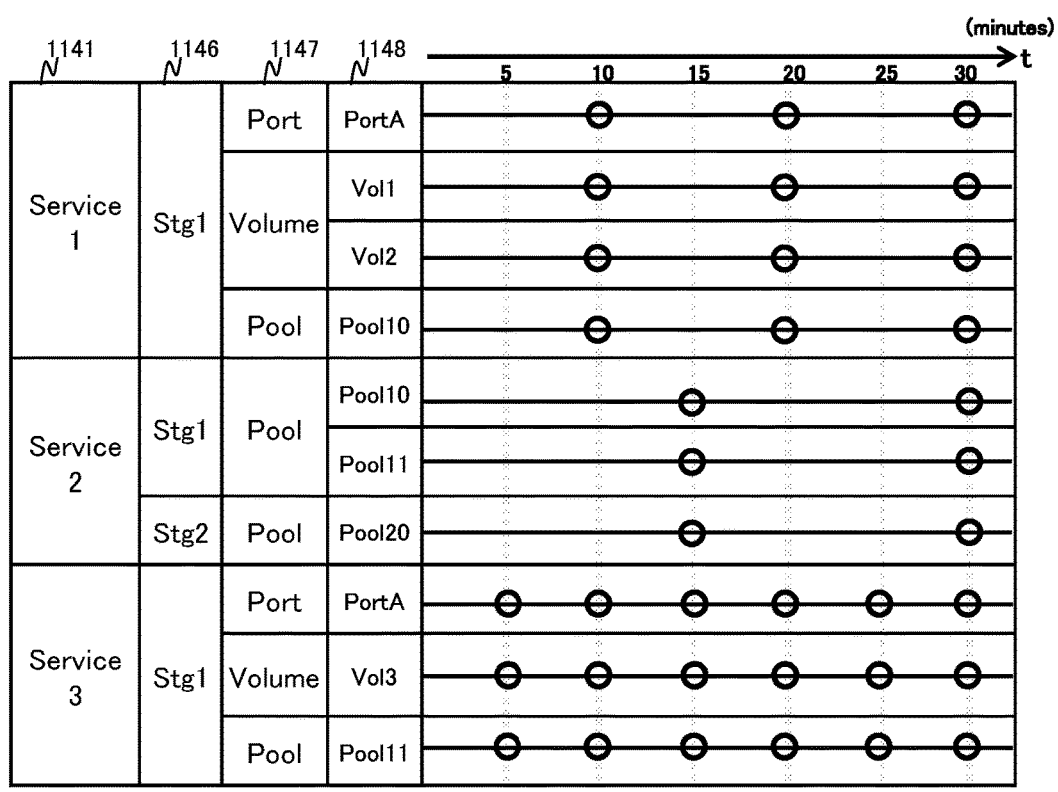
FIG. 7 is an explanatory diagram providing a time-sequential representation on the basis of information provision intervals of the running service management table shown in FIG. 6.

FIG. 7 is an explanatory diagram providing a time-sequential representation of the running service management table 1140 shown in FIG. 6 on the basis of the information provision interval 1143.

FIG. 7 shows whether or not information on each object specified by the running service ID 1141, the apparatus ID 1146, the object type 1147, and the object ID 1148 needs to be acquired at timings of the information provision intervals (for example, 5 minutes, 10 minutes, 15 minutes, 20 minutes, 25 minutes, and 30 minutes). In FIG. 7, "O" denoting a timing of each information provision interval indicates that information on an object corresponding to "O" must be acquired at that timing.

When acquiring information on objects having a same object ID 1148 included in services having different running service IDs 1141 at a same timing of the information provision intervals, the management computer 1000 may acquire information related to the object ID 1148 of any one of the services. This is because information on a same object in each of different running service IDs 1141 at the same timing of the information provision intervals is the same information. For example, in the case of FIG. 7, at a timing of "10 minutes" of the information provision intervals, information related to the object ID 1148 of "PortA" included in the service ID 1141 of "1" and the object ID 1148 of "PortA" included in the running service ID 1141 of "3" is the same information. Therefore, the management computer 1000 need only acquire information related to the object ID 1148 of "PortA" of any one of the running service IDs 1141 "1" and "3". In other words, at the timing of "10 minutes" of the information provision intervals, the management computer 1000 need only issue one acquisition request of information related to the object ID 1148 of "PortA" to the storage apparatus having the apparatus ID 1146 of "Stg1".

When acquiring information on an object corresponding to a same apparatus ID 1146 and a same object type 1147 included in services having different running service IDs 1141 at a same timing of the information provision intervals, the management computer 1000 may collectively acquire the information. For example, in the case of FIG. 7, at the timing of "10 minutes" of the information provision intervals, the object IDs 1148 of "Vol1" and "Vol2" included in the running service ID 1141 of "1" and the object ID 1148 of "Vol3" included in the running service ID 1141 of "3"

represent the same apparatus ID 1146 of "Stg1" and the same object type 1147 of "volume". Therefore, at the timing of "10 minutes" of the information provision intervals, the management computer 1000 need only issue one acquisition request of information related to the object IDs 1148 of "Vol1", "Vol2", and "Vol3" to the storage apparatus having the apparatus ID 1146 of "Stg1". In this manner, an acquisition request which consolidates acquisition requests for information on a plurality of objects may be referred to as a "bulk acquisition request".

Accordingly, the number of issued acquisition requests can be reduced. In addition, a situation where information on a same object is stored redundantly can be avoided. Therefore, a network load and/or a processing load in the computer system 1 and the management computer 1000 can be reduced. Furthermore, utilization efficiency of a capacity of the storage devices in the management computer 1000 can be improved. Moreover, details of processing regarding FIGS. 6 and 7 will be provided later (refer to FIGS. 9 and 10).

FIG. 8 shows a configuration example of the handler management table 1150.

The handler management table 1150 is a table for managing management computers 1000 to handle collection of information on objects. The handler management table 1150 may include, as item values, a timing 1151, a management computer ID 1152, an apparatus type 1153, an apparatus ID 1154, an object type 1155, an object ID 1156, and a related service ID 1157.

The timing 1151 is a value indicating a timing at which the management computer 1000 issues an acquisition request for information related to the object ID 1156. When a least common multiple of the information provision intervals 1143 of all running services (or services in a prescribed group) is assumed as one period, the value of the timing 1151 may be a timing for each period of the information provision interval 1143 of each service running in the period. For example, in the case of FIG. 6, assuming that the least common multiple "30 minutes" of the information provision intervals 1143 of "10 minutes", "15 minutes", and "5 minutes" is one period, the timing 1151 may be any one of "5 minutes", "10 minutes", "15 minutes", "20 minutes", "25 minutes", and "30 minutes" which are timings for each period of information provision intervals of the respective services running in the period (also refer to FIG. 7).

The management computer ID 1152 is an identifier of the management computer 1000 which issues an acquisition request at the timing 1151.

The apparatus type 1153, the apparatus ID 1154, the object type 1155, and the object ID 1156 are as described with reference to FIG. 6.

The related service ID 1157 is an identifier of a service which requires acquisition related to an object having the object ID 1156 at the timing 1151.

At the timing 1151 of "30 minutes" in FIG. 8, the management computer ID 1152 of "1" issues one acquisition request for information on an object related to the object ID 1156 of "PortA" to the apparatus ID 1154 of "Stg1". Since information related to the object ID 1156 of "PortA" is required by the related service IDs 1157 of "1" and "3" but is the same information, the management computer ID 1152 of "1" need only issue one acquisition request at the timing of "30 minutes".

In addition, at the timing 1151 of "30 minutes" in FIG. 8, the management computer ID 1152 of "3" issues one bulk acquisition request for information on objects related to the object IDs 1156 of "Pool10" and "Pool11" to the apparatus ID 1154 of "Stg1". This is because the apparatus ID 1154 of "Stg1" is the same and the object type 1155 "pool" is also the same.

One management computer (referred to as a "primary management computer") among the plurality of management computers 1000 in the computer system 1 may determine (distribute) a management computer to handle the acquisition of information on each object so that, at a certain timing, one management computer need only issue one acquisition request and/or one management computer need only issue one bulk acquisition request as described above.

Figure 9:
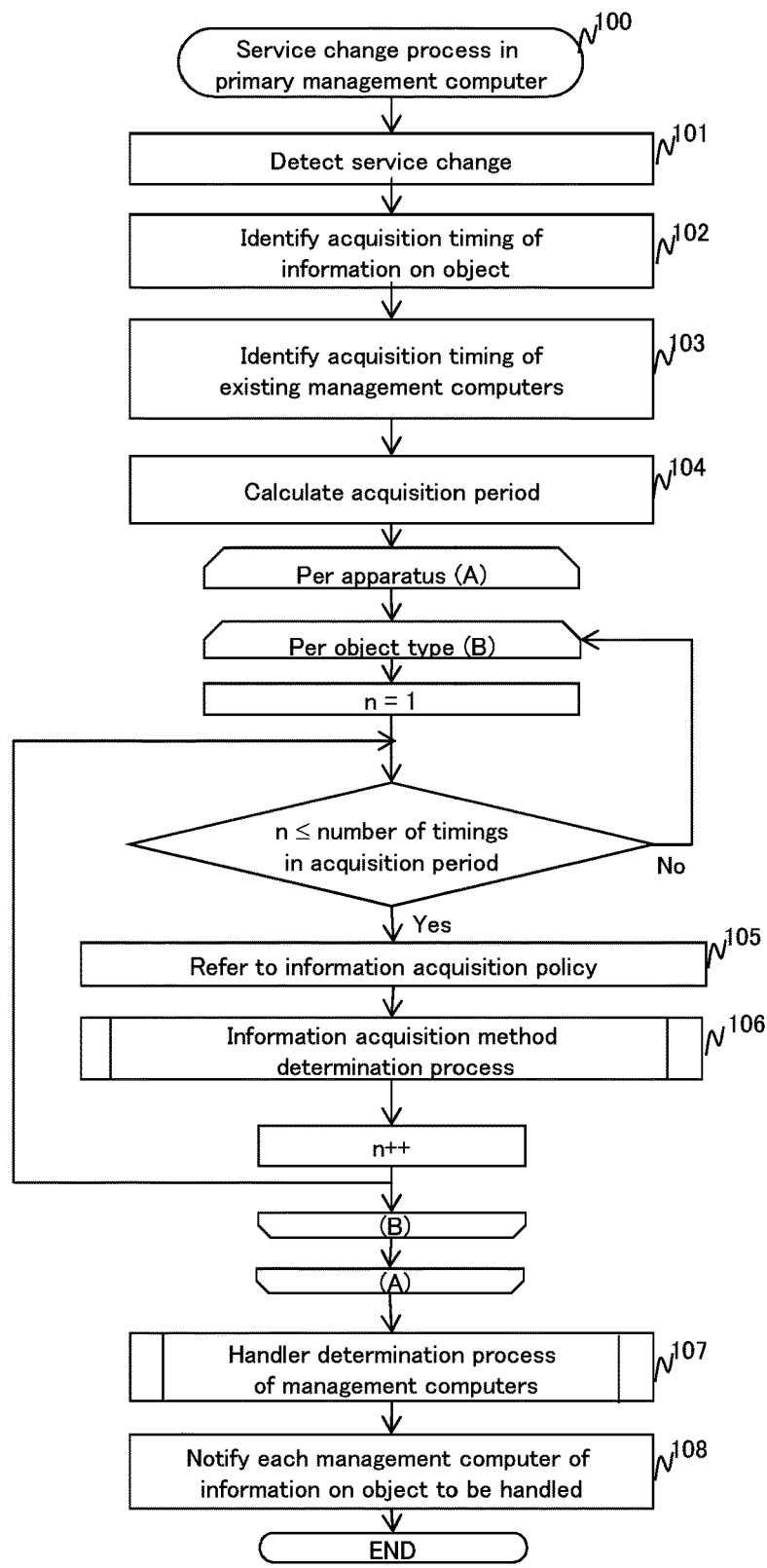
FIG. 9 is a flow chart showing a processing example of a primary management computer in a case where a service is changed.

FIG. 9 is a flow chart showing a processing example of a primary management computer in a case where a service is changed.

The present processing may be realized by the processor 1300 of the primary management computer by executing the service detecting program 1160, the service identification program 1170, the management computer determination program 1180, and the management computer cooperation program 1190 deployed on the memory 1100. While the present processing represents an example in a case where a new service is additionally run, similar processing is performed in a case where an object associated with a running service is updated or the like.

(Step 101) Upon detecting a change to a running state of a service (new addition, change, or the like of a service), the service detecting program 1160 advances to step 102. At this point, the service detecting program 1160 may receive information on contents of the change to the service. For example, the information on the contents of the change may be information input by a user via the input device 1500 and a GUI. Alternatively, the information on the contents of the change may be information transmitted from another management computer. The information on the contents of the change may include information such as a service type newly selected by the user, a service type to be added or changed, an information provision interval, and an operation to be a target of the service. In addition, the service detecting program 1160 may configure the information on the contents of the change in the service type 1142, the information provision interval 1143, and the operation ID 1144, and register the information as a record of a new service running ID 1141 in the running service management table 1140.

(Step 102) The service identification program 1170 identifies an object necessary for provision of the service and an acquisition timing of information on the object. Subsequently, the service identification program 1170 advances to step 103. For example, the service identification program 1170 may refer to the configuration information table 1130 and acquire configuration information related to the operation selected as a target of service in step 101. Typically, the service identification program 1170 may acquire, from the configuration information table 1130, the server ID 1132, the virtual compuDter ID 1133, the storage ID 1134, the port ID 1135, the volume ID 1136, and the pool ID 1137 corresponding to the operation ID 1131 selected as a target of service in step 101. Furthermore, the service identification program 1170 may refer to the service type-specific management table 1120, extract an object to be a management target from the acquired configuration information, and store information regarding the extracted object in the apparatus type 1145, the apparatus ID 1146, the object type 1147, and the object ID 1148 of one record in the running service management table 1140. In addition, the service identification program 1170 may cooperate with a function for managing access in order to identify information on an object which can be accessed by a user of the service and store only the identified information in the running service management table 1140.

(Step 103) The management computer determination program 1180 refers to information of the handler management table 1150 and identifies a service handled by each management computer 1000, information on an object, and the timing 1151 of information acquisition. Subsequently, the management computer determination program 1180 advances to step 104.

(Step 104) The management computer determination program 1180 calculates a least common multiple of the timings 1151 for respective services and configures the least common multiple as an acquisition period. Subsequently, the management computer determination program 1180 advances to step 105. For example, the management computer determination program 1180 calculates a least common multiple of the information provision interval of a new service to be additionally run and all information provision intervals 1143 of the running service management table 1140 (or all information provision intervals 1143 in a prescribed group). For example, in the case of FIG. 6, since the information provision interval 1143 of the running service ID 1141 of "1" is "10 minutes", the information provision interval 1143 of the running service ID 1141 of "2" is "15 minutes", and the information provision interval 1143 of the newly added service having the running service ID 1141 of "3" is "5 minutes", "30 minutes" that is the least common multiple of "10 minutes", "15 minutes", and "5 minutes" may be adopted as an acquisition period. In this case, respective timings at which the respective services acquire information in the acquisition period are "5 minutes", "10 minutes", "15 minutes", "20 minutes", "25 minutes", and "30 minutes".

(Step 105) The management computer determination program 1180 identifies an information acquisition policy corresponding to each timing within the acquisition period for each loop processing by a combination of an apparatus (A) and an object type (B).

Subsequently, the management computer determination program 1180 advances to step 106. An apparatus and an object type selected as targets of the loop processing (A) and (B) are respectively referred to as a "selected apparatus" and a "selected object type". In this case, a policy regarding collection of information on an object is defined in the information acquisition policy. For example, in the information acquisition policy, a first policy may be defined in which, when a plurality of different running services have a matching timing among repetitions of information provision periods and include a same object, collection of information on the same object is to be handled by one management computer 1000. For example, in the information acquisition policy, a second policy may be defined in which, when a plurality of different services have a matching timing among repetitions of information provision periods and include objects of a same type, and the objects of the same type are included in one apparatus, collection of information on the objects of the same type is to be handled by one management computer 1000.

(Step 106) In accordance with the information acquisition policy identified in step 105, the management computer determination program 1180 executes an information acquisition method determination process at a timing selected as a target of the loop processing (for example, an n-th timing (where n is a positive integer): hereinafter, referred to as a "selected timing"). Subsequently, the management computer determination program 1180 advances to step 107. Moreover, the information acquisition policy may be stored in any format such as a character string format in a table. Contents of the information acquisition policy may be configured by the user or may be built into a management computer in advance. Details of the information acquisition method determination process will be provided later (refer to FIG. 10).

(Step 107) The management computer cooperation program 1190 executes a handler determination process of management computers. Details of the present processing will be provided later (refer to FIG. 13). Subsequently, the management computer cooperation program 1190 advances to step 108.

(Step 108) The management computer cooperation program 1190 notifies each management computer 1000 determined in step 107 of information such as an object to be handled, and ends the present processing. Each management computer 1000 having received the notification issues, in accordance with the information acquisition policy, an acquisition request for information on an object to apparatuses handled by the management computer 1000 itself at timings assigned to the management computer 1000 itself. For example, when complying with the first policy described above, the management computer 1000 having received the notification may issue one request for information on a same object to apparatuses having the same object at a matching timing among repetitions of information provision periods. For example, when complying with the second policy described above, the management computer 1000 having received the notification may issue one request (one bulk acquisition request) for information on a plurality of objects of the same type to one apparatus at a matching timing among repetitions of information provision periods.

For the purpose of issuing notifications among management computers, each management computer 1000 may store information on a list of management computers including itself and other management computers as a table. The table that stores the information on a list of management computers may store information necessary for accessing each management computer. For example, the table may have records associating an identifier (identification information) of a management computer, an IP address of the management computer, and information (for example, site information) of an installation location of the management computer with one another. The table may be shared by all management computers. For example, the table may be shared through cooperation among respective management computer cooperation programs, by using functions of a DB, or by using a name server such as a DNS.

Figure 10:
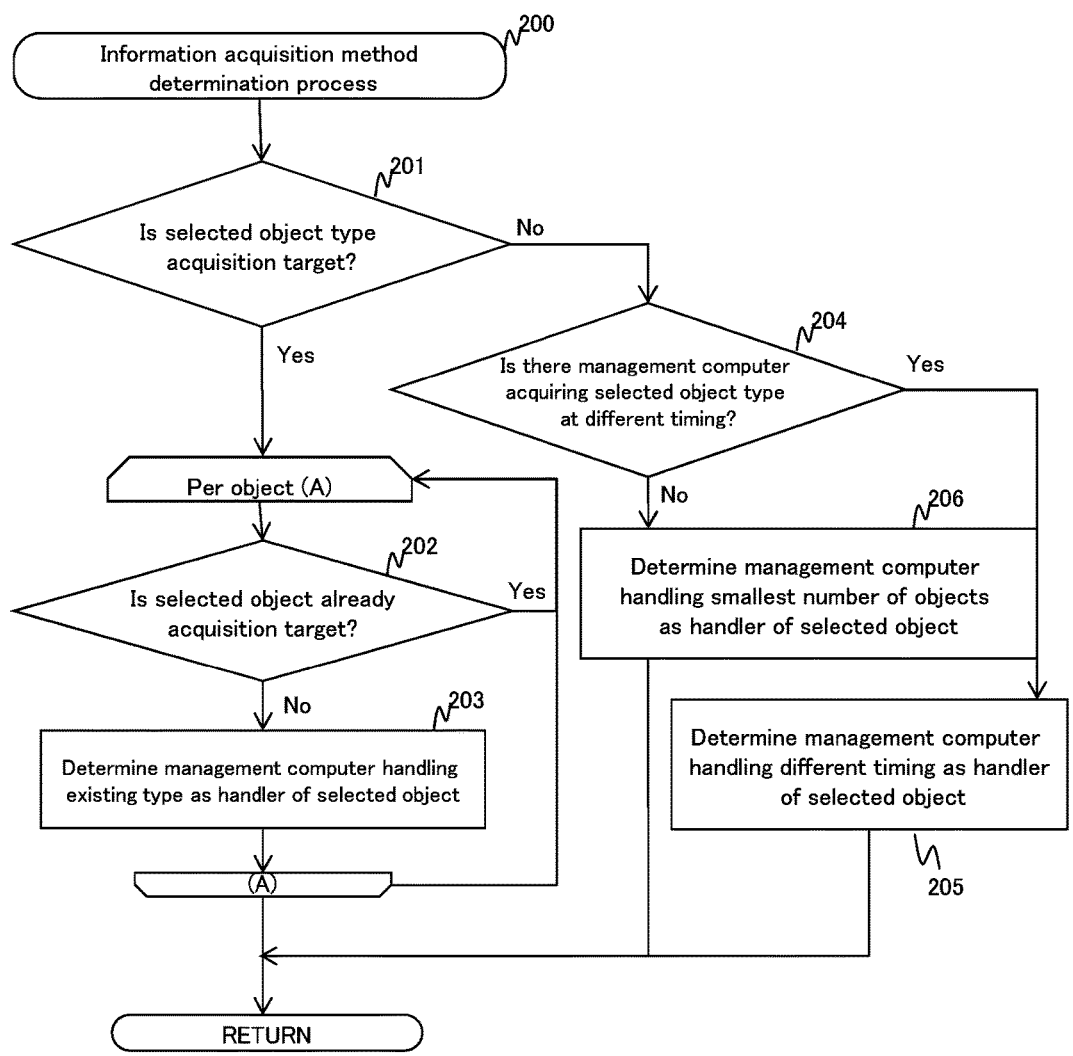
FIG. 10 is a flow chart showing an example of an information acquisition method determination process.

FIG. 10 is a flow chart showing an example of an information acquisition method determination process. The flow chart corresponds to details of step 106 in FIG. 9.

(Step 201) The management computer determination program 1180 determines whether or not the selected object type of the selected apparatus has already become an acquisition target at the selected timing shown in FIG. 9. When the determination result of step 201 is positive (YES), the management computer determination program 1180 advances to step 202, but when the determination result of step 201 is negative (NO), the management computer determination program 1180 advances to step 204.

(Step 202) The management computer determination program 1180 selects one object (referred to as a "selected object") from the one or more objects included in the selected object type of the selected apparatus at the selected timing, and determines whether or not the information on the selected object has already become an acquisition target. In other words, the management computer determination program 1180 determines whether or not a same object exists at a same timing. When the determination result of step 202 is positive (YES), the management computer determination program 1180 selects another object and performs a similar determination. This is because the information on the selected object need not be acquired. When the determination result of step 202 is negative (NO), the management computer determination program 1180 advances to step 203.

(Step 203) The management computer determination program 1180 determines a management computer already handling the selected object type of the selected apparatus at the selected timing, as a handler of the selected object. In addition, when there remains an unselected object, the management computer determination program 1180 selects another object and performs steps 202 and 203 (executes the loop processing (A)), but if not, the management computer determination program 1180 returns to a call source of the present processing.

Accordingly, acquisition requests for information on objects of a same type can be made collectively (a bulk acquisition request can be made). Parameters with respect to a plurality of instruction sets may be describable in the bulk acquisition request. When an apparatus receives a bulk acquisition request, the apparatus may execute the instruction sets included in the bulk acquisition request and collectively return execution results thereof as one response. Accordingly, an acquisition process of information on objects may be accelerated.

According to a bulk acquisition request, processing included in preprocessing and post-processing can be performed at once or efficiency of processing such as lock acquisition accompanying physical processing with respect to an apparatus can be increased. Accordingly, a bottleneck attributable to physical processing with respect to an apparatus may be improved and processing may be accelerated.

(Step 204) When the selected object type of the selected apparatus has not become an acquisition target at the selected timing shown in FIG. 9 (step 204: NO), the management computer determination program 1180 determines whether or not there is a management computer having acquired information related to the selected object type at another timing. When the determination result of step 204 is positive (YES), the management computer determination program 1180 advances to step 205, but when the determination result of step 204 is negative (NO), the management computer determination program 1180 advances to step 206.

(Step 205) The management computer determination program 1180 determines the management computer having acquired information related to the selected object type at another timing, as a handler of the selected object type at the selected timing. Subsequently, a return is made to a call source of the present processing.

(Step 206) The management computer determination program 1180 determines a management computer which handles the smallest number of objects at the selected timing, as a handler of the selected object type at the selected timing. Subsequently, a return is made to a call source of the present processing.

As described above, in step 204, an object handled by each management computer is made the same as at another timing. However, step 205 maybe executed without executing step 204. For example, when none of the selected object types of the selected apparatus has been configured as an acquisition target at the selected timing, a management computer which handles the smallest number of objects at the selected timing may be determined, as a handler of the selected object type. Alternatively, a management computer to handle the selected object type may be determined on the basis of load information of a CPU or a memory or information such as time required for information acquisition.

In addition to the examples described above, examples of information collection policies may include "a policy of acquiring information on all objects in duplicate to provide against acquisition failures and the like", "a policy of multiply acquiring information on an object only with respect to specific devices or specific objects due to SLA per user or the like", and "a policy of multiply acquiring information on an object only during a specific period of time (such as when some kind of fault event has occurred)". In this manner, by defining various policies and preparing a processing program in accordance with each policy, an information acquisition method can be switched to another in a flexible manner. Accordingly, the number of management computers can be suitably adjusted. As a result, services can be provided at relatively low cost.

Figure 11:
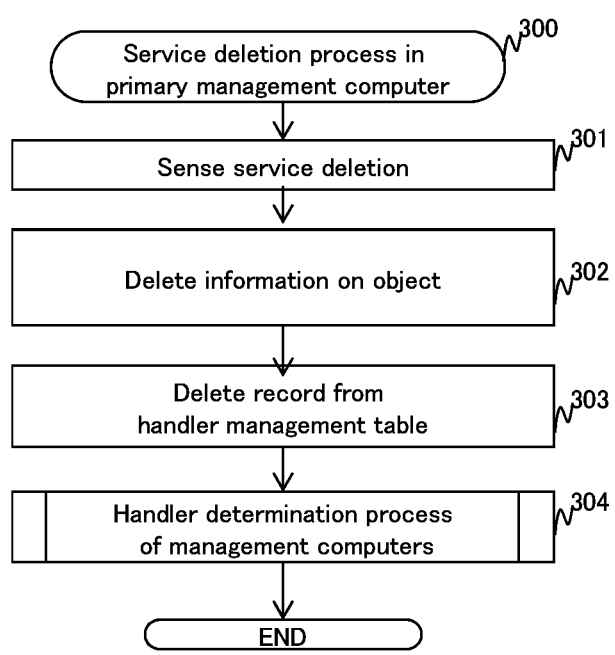
FIG. 11 is a flow chart showing a processing example of a primary management computer in a case where a service is deleted.

FIG. 11 is a flow chart showing a processing example of a primary management computer in a case where a service is deleted.

The present processing may be realized by the processor 1300 of the primary management computer 1000 by executing the service detecting program 1160, the service identification program 1170, the management computer determination program 1180, and the management computer cooperation program 1190 deployed on the memory 1100.

(Step 301) Upon detecting a change to a running state of a service (deletion of a service), the service detecting program 1160 advances to step 302. At this point, the service detecting program 1160 may receive information on contents of the deletion of the service in a similar manner to step 101. For example, the information on the contents of the deletion may be information input by a user via the input device 1500 and a GUI. Alternatively, the information on the contents of the deletion may be information transmitted from another management computer. The information on the contents of the deletion may include information indicating a service that is a deletion target (referred to as a "deletion target service") selected by the user from running services.

(Step 302) The service identification program 1170 deletes information on an object having been necessary for providing the deletion target service from the running service management table 1140. Subsequently, the service identification program 1170 advances to step 303.

(Step 303) The management computer determination program 1180 deletes a record having the related service ID 1157 of the deletion target service from the handler management table 1150. Subsequently, the management computer determination program 1180 advances to step 304.

(Step 304) The management computer cooperation program 1190 executes a handler determination process of management computers. Details of the present processing will be provided later (refer to FIG. 13). Subsequently, the present processing is ended.

Figure 12:
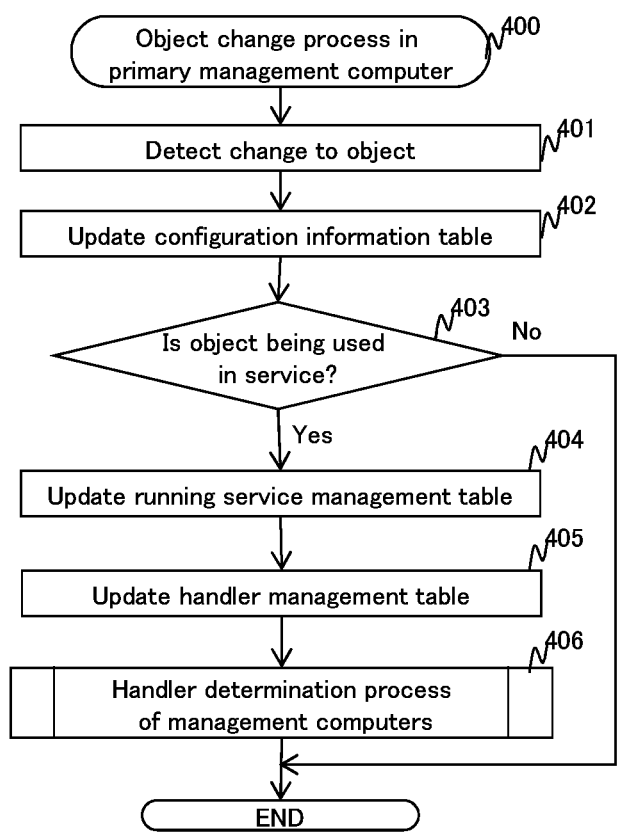
FIG. 12 is a flow chart showing a processing example of a primary management computer in a case where an object is changed.

FIG. 12 is a flow chart showing a processing example of a primary management computer in a case where an object is changed.

The present processing may be realized by the processor 1300 of the primary management computer 1000 by executing the object sensing program 11110, the service identification program 1170, the management computer determination program 1180, and the management computer cooperation program 1190 deployed on the memory 1100.

(Step 401) Upon detecting a change to an object, the object sensing program 11110 advances to step 402.

Examples of a change to an object include a case where the logical volume 2210 is newly created from the pool 2220. For example, the object sensing program 11110 detects an addition of an object, a change to an object, or the like in an apparatus. For example, information on contents of the change may be input from the management computer 1000. Alternatively, the information on the contents of the change may be information transmitted from another management computer. Alternatively, the information on the contents of the change may be notified from the apparatus. Alternatively, the information on the contents of the change may be regularly acquired by the object sensing program 11110 from the apparatus.

(Step 402) The object sensing program 11110 changes the configuration information table 1130 on the basis of the information on the contents of the change to the object. Subsequently, the object sensing program 11110 advances to step 403.

(Step 403) The object sensing program 11110 refers to the running service management table 1140 and determines whether or not the object changed in the configuration information table 1130 is being used by a running service. When the determination result of step 403 is positive (YES), the object sensing program 11110 advances to step 404, but when the determination result of step 403 is negative (NO), the object sensing program 11110 ends the present processing.

(Step 404) The object sensing program 11110 reflects the contents of the change onto the running service management table 1140. Subsequently, the object sensing program 11110 advances to step 405.

(Step 405) The object sensing program 11110 reflects the contents of the change onto the handler management table 1150. Subsequently, the object sensing program 11110 advances to step 406.

(Step 406) The management computer cooperation program 1190 executes a handler determination process of management computers and ends the present processing. Details of the present processing will be provided later (refer to FIG. 13).

Figure 13:
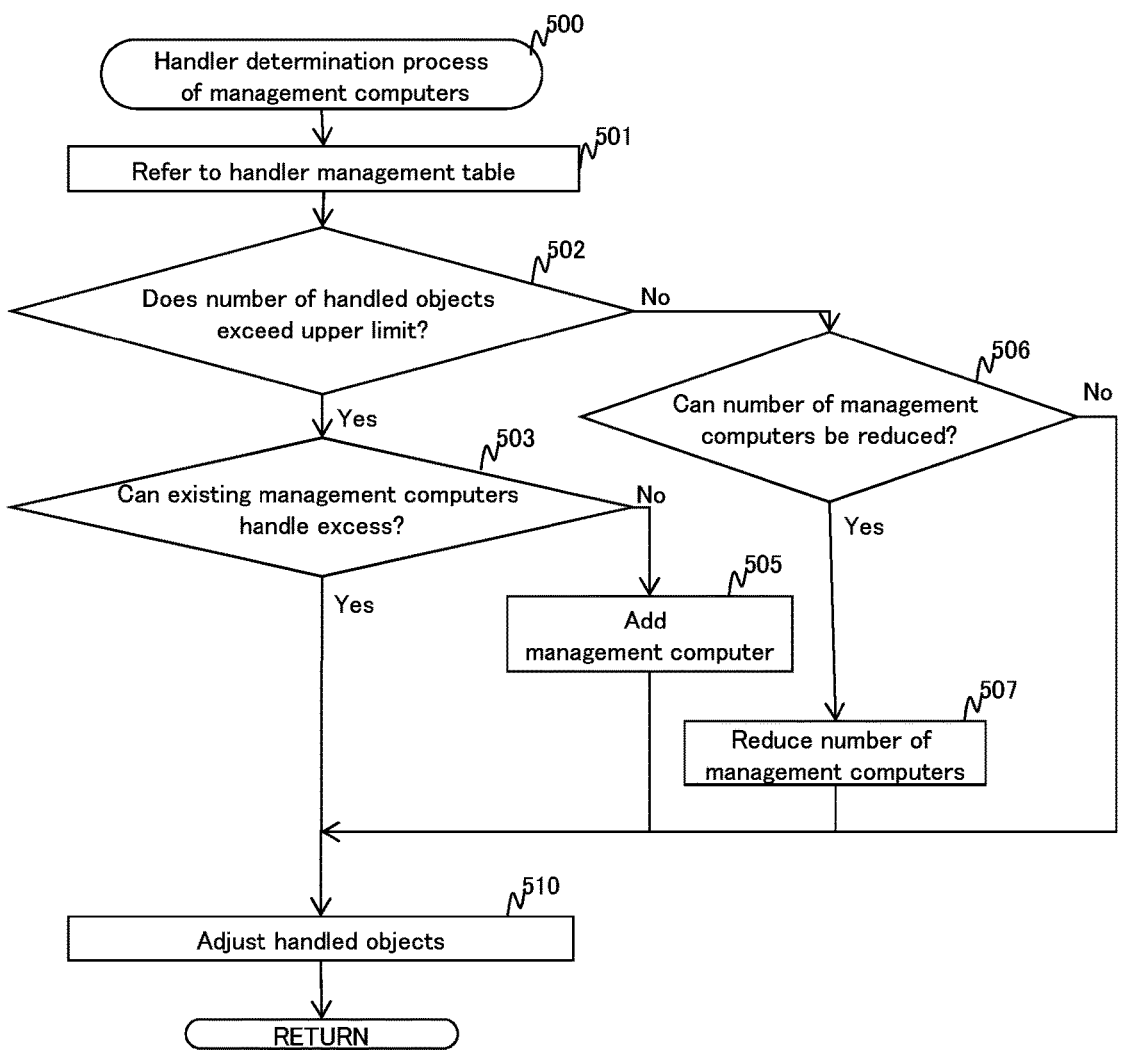
FIG. 13 is a flowchart showing an example of a handler determination process in a primary management computer.

FIG. 13 is a flow chart showing an example of a handler determination process in a primary management computer. The present processing corresponds to details of step 107 in FIG. 9, step 304 in FIG. 11, and step 406 in FIG. 12.

(Step 501) The management computer cooperation program 1190 refers to the handler management table 1150. Subsequently, the management computer cooperation program 1190 advances to step 502.

(Step 502) As a result of referring to the handler management table 1150, the management computer cooperation program 1190 determines whether or not there is a management computer which handles objects, the number of which exceeds a prescribed upper limit. When the determination result of step 502 is positive (YES), the management computer cooperation program 1190 advances to step 503, but when the determination result of step 502 is negative (NO), the management computer cooperation program 1190 advances to step 506.

(Step 503) The management computer cooperation program 1190 determines whether or not excess objects can be handled by an existing management computer so that the upper limit is not exceeded. When the determination result of step 503 is positive (YES), the management computer cooperation program 1190 advances to step 510, but when the determination result of step 503 is negative (NO), the management computer cooperation program 1190 advances to step 505.

(Step 505) The management computer cooperation program 1190 newly prepares one or more management computers for handling the excess objects. Subsequently, the management computer cooperation program 1190 advances to step 510.

(Step 506) When the management computer cooperation program 1190 determines in step 502 that there is no management computer which handles objects, the number of which exceeds the upper limit (NO), the management computer cooperation program 1190 determines whether or not, even when the number of existing management computers are reduced, all objects can be handled by the remaining management computers so that the upper limit is not exceeded. When the determination result of step 506 is positive (YES), the management computer cooperation program 1190 advances to step 507, but when the determination result of step 506 is negative (NO), the management computer cooperation program 1190 advances to step 510.

(Step 507) The management computer cooperation program 1190 reduces the number of existing management computers within a range where all objects can be handled by the remaining management computers so that the upper limit is not exceeded. Subsequently, the management computer cooperation program 1190 advances to step 510.

(Step 510) The management computer cooperation program 1190 adjusts objects to be handled among management computers. The management computer cooperation program 1190 may add or delete management computers as necessary. In addition, the management computer cooperation program 1190 reflects contents of the adjustment onto the handler management table 1150. In other words, the management computer cooperation program 1190 determines which management computer is to handle acquisition of which information on an object. Subsequently, a return is made to a call source of the present processing.

The processing for adjusting handlers of objects in step 510 may be, for example, processing for leveling, among management computers, the number of objects to be handled by each management computer, information on loads on the CPU or the memory of each management computer, the time required by each management computer to acquire information, and the like.

Reflection of the contents of adjustment onto the handler management table 1150 in step 510 may be performed at an arbitrary timing such as a timing of next processing after notifying each management computer of handler assignments in the present processing.

The addition process (or the deletion process) of a management computer described above may be processing involving referring to a table of information on a list of management computers including itself and other management computers described earlier and newly generating a virtual computer (or deleting a virtual computer) using a same image or processing involving generating a process for a management computer (or deleting a process).

When adding a management computer, the management computer cooperation program 1190 may newly acquire information indicating its own management computer and other management computers by referring to a pool of available IP addresses or the like and update the table of the information on a list (described earlier) of management computers including its own management computer and other management computers.

The upper limit of the number of objects that can be managed by a management computer may be an upper limit based on other indices. For example, an upper limit of loads on a CPU or a memory by a management computer or an upper limit of a time that can be used for information acquisition may be adopted. In addition, the processing shown in FIG. 13 may be periodically executed or executed at an arbitrary timing specified by the user.

Figure 14:
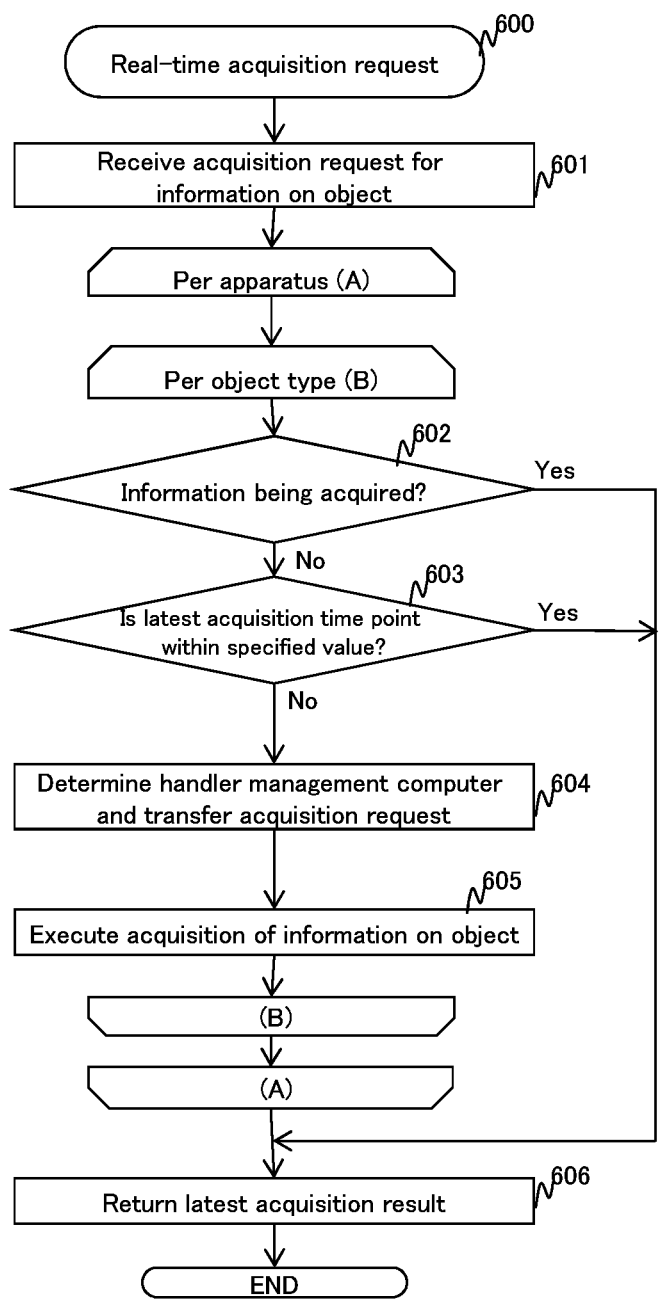
FIG. 14 is a flow chart showing an example of processing when an acquisition request for real-time information of an object is received.

FIG. 14 is a flow chart showing an example of processing when an acquisition request for real-time information of an object is received. In other words, the present processing is processing in a case where the information provision interval 1122 of the service type-specific management table 1120 is "real time" (in other words, a case where information provision is not periodically executed).

The present processing may be realized by the processor 1300 of the primary management computer 1000 by executing the information acquisition program 11100 and the management computer cooperation program 1190 deployed on the memory 1100.

(Step 601) Upon receiving an acquisition request for information on an object, the information acquisition program 11100 advances to step 602. The present step may be processing for receiving information specified by a user via the input device 1500 and a GUI. Alternatively, the present step may be processing in which the communication device 1200 receives information input from any management computer.

(Step 602) The information acquisition program 11100 determines, for each type of object for which an acquisition request has been received, whether or not information on all objects of the type is currently being acquired. When the determination result of step 602 is positive (YES), the information acquisition program 11100 advances to step 606 after completion of the acquisition, but when the determination result of step 602 is negative (NO), the information acquisition program 11100 advances to step 603.

(Step 603) When there is even one object currently not being acquired (step 602: NO), the management computer cooperation program 1190 determines whether or not a latest acquisition time point of the object is within a specified value. When the determination result of step 603 is positive (YES), the management computer cooperation program 1190 advances to step 606, but when the determination result of step 603 is negative (NO), the management computer cooperation program 1190 advances to step 604.

(Step 604) When the latest acquisition time point of the object is not within the specified value (step 603: NO), the management computer cooperation program 1190 refers to the handler management table 1150, determines a management computer to handle the received object, and transfers an acquisition request to the determined management computer. Subsequently, the management computer cooperation program 1190 advances to step 605. The (transfer destination) management computer to handle the object may be determined on the basis of, for example, load information on a CPU or a memory of the management computer or information such as time required for information acquisition by the management computer.

(Step 605) The management computer having been transferred the acquisition request acquires information on the basis of the acquisition request and sends back a latest acquisition result to the acquisition request source.

When processing of steps 602 to 605 described above has been performed for all apparatuses and for all types of objects for which an acquisition request has been received, the present processing advances to step 606.

(Step 606) The management computer cooperation program 1190 transmits the latest acquisition result to a transmission source of the acquisition request for the information on an object received in step 601. Subsequently, the present processing is ended.

Moreover, when an information acquisition timing is proximately configured within a specific value, the information acquisition described above may be performed together with other objects to be acquired at the proximate information acquisition timing.

According to the embodiment described above, by adjusting which management computer is to acquire information on an object among management computers, even when information on an object that needs to be acquired overlaps among services, redundant acquisition of information on an object can be prevented (or reduced). As a result, a load on a device that is a provider of information on an object can be reduced.

The embodiment described above merely represents an example for illustrating the present invention, and it is to be understood that the scope of the present invention is not limited to the embodiment. It will be obvious to those skilled in the art that the present invention can be implemented in various other modes without departing from the spirit of the present invention.

REFERENCE SIGNS LIST

1 Computer system
1000 Management computer
2000 Storage apparatus
3000 Server

The invention claimed is:
1. A computer system comprising a plurality of apparatuses and a plurality of management computers, wherein
the apparatuses include one or more objects to be management targets of the management computers,
the plurality of management computers are configured to provide services with the one or more objects as the management targets,
an information provision period is configured for each of the objects of each of the services, and
a primary management computer being one of the plurality of management computers is configured to:
determine a management computer to handle collection of information on each of the objects on the basis of an information collection policy defining a policy regarding collecting information about the objects and the information provision period configured for each of the objects of each of the services that are running; and
notify each of the determined management computers of an object of which management is to be handled by the management computer,
wherein, in the information collection policy, a first policy is defined to the effect that, when a plurality of different running services have a matching timing among repetitions of information provision periods and include a same object, collection of information on the same object is to be handled by one management computer.
2. The computer system according to claim 1, wherein
a management computer which is determined on the basis of the first policy and which has received the notification is configured to issue one request for information on the same object to apparatuses having the same object at a matching timing among repetitions of information provision periods.

3. The computer system according to claim 2, wherein the matching timing among repetitions of information provision periods is a timing of a period of a least common multiple calculated on the basis of respective periods of a plurality of same objects.

4. The computer system according to claim 1, wherein in the information collection policy, a second policy is defined to the effect that, when a plurality of different services have a matching timing among repetitions of information provision periods and include objects of a same type, and the objects of the same type are included in one apparatus, collection of information on the objects of the same type is to be handled by one management computer.

5. The computer system according to claim 4, wherein a management computer which is determined on the basis of the second policy and which has received the notification is configured to issue one request for information on a plurality of objects of the same type to the one apparatus at a matching timing among repetitions of information provision periods.

6. The computer system according to claim 4, wherein the primary management computer is configured to:
when running a new service, determine whether or not there is an object complying with the first policy or the second policy among respective objects of respective running services with respect to each new object to be a management target by the new service;
when determining that the new object complies with the first policy, determine a management computer currently handling an object complying with the first policy, as a handler of collection of information on the new object; and
when determining that the new object does not comply with the first policy but complies with the second policy, determine a management computer currently handling an object complying with the second policy, as a handler of collection of information on the new object.

7. The computer system according to claim 6, wherein the primary management computer is configured to:
manage the number of objects currently being handled by each of the management computers; and
when determining that the new object complies with neither the first policy nor the second policy, determine a management computer currently handling the smallest number of objects, as a handler of collection of information on the new object.

8. The computer system according to claim 4, wherein the primary management computer is configured to:
change, with respect to a management computer currently handling objects, the number of which is larger than a prescribed threshold, a handler of one or more objects currently being handled by the management computer to a management computer currently handling objects, the number of which is smaller than the prescribed threshold.

9. A computer system comprising a plurality of apparatuses and a plurality of management computers, wherein
the apparatuses include one or more objects to be management targets of the management computers,
the plurality of management computers are configured to provide services with the one or more objects as the management targets,
an information provision period is configured for each of the objects of each of the services, and a primary management computer being one of the plurality of management computers is configured to:
determine a management computer to handle collection of information on each of the objects on the basis of an information collection policy defining a policy regarding collecting information about the objects and the information provision period configured for each of the objects of each of the services that are running; and
notify each of the determined management computers of an object of which management is to be handled by the management computer
wherein, in the information collection policy, a policy is defined to the effect that, when a plurality of different services have a matching timing among repetitions of information provision periods and include objects of a same type, and the objects of the same type are included in one apparatus, collection of information on the objects of the same type is to be handled by one management computer.

10. The computer system according to claim 9, wherein a management computer which is determined on the basis of the policy and which has received the notification is configured to issue one request for information on a plurality of objects of the same type to the one apparatus at a matching timing among repetitions of information provision periods.

11. An apparatus management method,
the apparatus including one or more objects to be management targets by a management computer,
a plurality of management computers providing services with the one or more objects as management targets,
an information provision period being configured for each of the objects of each of the services,
the management method comprising causing a primary management computer being one of the plurality of management computers to:
determine a management computer to handle collection of information on each of the objects on the basis of an information collection policy defining a policy regarding collecting information about the objects and the information provision period configured for each of the objects of each of the services that are running; and
notify each of the determined management computers of an object of which management is to be handled by the management computer,
wherein, in the information collection policy, a first policy is defined to the effect that, when a plurality of different running services have a matching timing among repetitions of information provision periods and include a same object, collection of information on the same object is to be handled by one management computer.

12. The apparatus management method according to claim 11, wherein
a management computer which is determined on the basis of the first policy and which has received the notification is configured to issue one request for information on the same object to apparatuses having the same object at a matching timing among repetitions of information provision periods.

13. The apparatus management method according to claim 12, wherein
the matching timing among repetitions of information provision periods is a timing of a period of a least common multiple calculated on the basis of respective periods of a plurality of same objects.

14. The apparatus management method according to claim 11, wherein in the information collection policy, a second policy is defined to the effect that, when a plurality of different services have a matching timing among repetitions of information provision periods and include objects of a same type, and the objects of the same type are included in one apparatus, collection of information on the objects of the same type is to be handled by one management computer.

15. The apparatus management method according to claim 14, wherein a management computer which is determined on the basis of the second policy and which has received the notification is configured to issue one request for information on a plurality of objects of the same type to the one apparatus at a matching timing among repetitions of information provision periods.

16. The apparatus management method according to claim 14, wherein the management method comprising causing a primary management computer being one of the plurality of management computers to:

when running a new service, determine whether or not there is an object complying with the first policy or the second policy among respective objects of respective running services with respect to each new object to be a management target by the new service;

when determining that the new object complies with the first policy, determine a management computer currently handling an object complying with the first policy, as a handler of collection of information on the new object; and when determining that the new object does not comply with the first policy but complies with the second policy, determine a management computer currently handling an object complying with the second policy, as a handler of collection of information on the new object.

17. The apparatus management method according to claim 16, wherein the management method comprising causing a primary management computer being one of the plurality of management computers to:

manage the number of objects currently being handled by each of the management computers; and when determining that the new object complies with neither the first policy nor the second policy, determine a management computer currently handling the smallest number of objects, as a handler of collection of information on the new object.

18. The apparatus management method according to claim 14, wherein the management method comprising causing a primary management computer being one of the plurality of management computers to:

change, with respect to a management computer currently handling objects, the number of which is larger than a prescribed threshold, a handler of one or more objects currently being handled by the management computer to a management computer currently handling objects, the number of which is smaller than the prescribed threshold.

* * * * *